(12) United States Patent
Miyawaki

(10) Patent No.: US 9,185,851 B2
(45) Date of Patent: Nov. 17, 2015

(54) POLE SAW

(75) Inventor: Shozo Miyawaki, Hyogo (JP)

(73) Assignee: UM: KOGYO Inc., Hyogo (JP)

( * ) Notice: Subject to any disclaimer, the term of this patent is extended or adjusted under 35 U.S.C. 154(b) by 149 days.

(21) Appl. No.: 14/004,277

(22) PCT Filed: Mar. 15, 2011

(86) PCT No.: PCT/JP2011/055997
§ 371 (c)(1),
(2), (4) Date: Sep. 10, 2013

(87) PCT Pub. No.: WO2012/124049
PCT Pub. Date: Sep. 20, 2012

(65) Prior Publication Data
US 2013/0340266 A1    Dec. 26, 2013

(51) Int. Cl.
*A01G 3/08*    (2006.01)
(52) U.S. Cl.
CPC ..................................... *A01G 3/083* (2013.01)
(58) Field of Classification Search
CPC .............. B25G 3/00; B25G 3/02; B25G 3/12; B25G 3/18; B25G 3/26; A01G 3/08–3/083
See application file for complete search history.

(56) References Cited

U.S. PATENT DOCUMENTS

| | | | |
|---|---|---|---|
| 4,958,395 A * | 9/1990 | Busskohl | 7/145 |
| 5,228,202 A * | 7/1993 | Liao | 30/249 |
| 6,904,687 B1* | 6/2005 | Hill, Sr. | 30/296.1 |
| 7,958,640 B1* | 6/2011 | Mandriota | 30/144 |
| 2008/0236124 A1* | 10/2008 | Heinzelmann | 56/12.7 |
| 2010/0037469 A1* | 2/2010 | Chubb | 30/198 |
| 2012/0049554 A1* | 3/2012 | Santoloci | 294/181 |

FOREIGN PATENT DOCUMENTS

| | | |
|---|---|---|
| JP | 6041149 | 3/1985 |
| JP | 3026169 | 4/1996 |
| JP | 3153730 | 8/2009 |

* cited by examiner

*Primary Examiner* — Stephen Choi
(74) *Attorney, Agent, or Firm* — Bacon & Thomas, PLLC

(57) ABSTRACT

A pole saw is provided which allows a saw blade to be manually attached or detached in a simple and easy manner. The pole saw includes the saw blade (10), a long handle (20) provided with one or more stages of poles, and a connecting bracket (30) for attaching the saw blade (10) to the distal end of the long handle (20). The pole saw is configured such that the connection and disconnection between the connecting bracket (30) and the long handle (20) are effected by a combination of pin locking and screw locking, the pin locking being effected by a spring-biased latching pin (40), the screw locking being effected by a dedicated hand screw (50) having a grip head (51).

2 Claims, 5 Drawing Sheets

POLE SAW

TECHNICAL FIELD

The present invention relates to a pole saw, and more particularly to a pole saw which allows a saw blade to be manually attached to and detached from a long handle in a simple manner.

BACKGROUND ART

A pole saw generally has a lengthy handle and a comparatively large saw blade attached to the tip end of the handle, and thus is bulky and often obstacle when carrying it around or storing it. Particularly when a large saw blade is attached to the tip end of a long handle, it is difficult to handle and store it.

Japanese Utility Model Registration No. 3153730 (Patent Document 1) discloses a structure which has a control pole (17), an attachment (15) attached to a distal end of the pole by a bolt (18), and a saw section (13) attached to the attachment (15) by a bolt (16).

Japanese Patent Application Laid-Open No. 10-67001 (Patent Document 2) discloses a saw having a replacement saw blade (7) configured to be foldable.

Japanese Patent Application Laid-Open No. 2000-43001 (Patent Document 3) also discloses a pole saw having a saw blade body (3) configured to be foldable.

PRIOR ART DOCUMENTS

Patent Documents

Patent Document 1: Japanese Utility Model Registration No. 3153730
Patent Document 2: Japanese Patent Application Laid-Open No. 10-67001
Patent Document 3: Japanese Patent Application Laid-Open No. 2000-43001

DISCLOSURE OF THE INVENTION

Problems to be Solved by the Invention

According to the structure disclosed in Patent Document 1 above, although a wing bolt is used as the bolt (18) for connecting the attachment (15) to the control pole (17), from what can be seen, the wing size of the wing bolt is small, which does not seem so suitable for a manual screwing operation for attachment/detachment as a practical matter. Further, the attachment (15) is connected to the control pole (17) at two locations, by using bolts (18) alone. The screwing operation at two locations would be troublesome, hindering smooth attaching/detaching operation.

That is, according to the structure disclosed in Patent Document 1, it would be essentially impossible to simply and easily perform the manual operation of attaching and detaching the attachment (15) to and from the control pole (17).

As to the structure disclosed in Patent Document 2 above, although the replacement saw blade (7) may be foldable, the replacement saw blade (7) in itself cannot be readily attached or detached. Furthermore, a back metal (3), a fixing jig (6), and other required elements result in a complicated structure.

In the case of the pole saw disclosed in Patent Document 3 above, as in the structure disclosed in Patent Document 2, although the saw blade body (3) may be foldable, the saw blade body (3) in itself cannot be readily attached or detached. The structure is complicated as well.

In view of the foregoing, an object of the present invention is to solve the problems of the conventional pole saws as described above and to provide a pole saw which allows a saw blade to be manually attached and detached in a simple and easy manner.

Means for Solving the Problems

A pole saw according to the present invention has a first feature that it includes a saw blade, a long handle provided with one or more stages of poles, and a connecting bracket for attaching the saw blade to a distal end of the long handle, wherein connection and disconnection between the connecting bracket and the long handle are effected by a combination of pin locking and screw locking, the pin locking being effected by a spring-biased latching pin, the screw locking being effected by a dedicated hand screw having a grip head.

Further, the pole saw according to the present invention has, in addition to the above-described first feature, a second feature that the connecting bracket includes a securing flat section for use in screw-fixing the saw blade, and a connecting tube for connecting a tubular pole at a distal end of the long handle, the connecting tube of the connecting bracket has a first connecting hole and a second connecting hole provided at two locations spaced apart from each other in a longitudinal direction, the second connecting hole serving as a through hole with an internally threaded rear-side hole provided at the corresponding position on the opposite side of the tube, the first connecting hole serving as a half-through hole with no rear-side hole provided at the corresponding position on the opposite side of the tube, the tubular pole, as with the connecting tube of the connecting bracket, has a first connecting hole and a second connecting hole provided at two locations spaced apart from each other in a longitudinal direction, the second connecting hole serving as a through hole with a non-threaded rear-side hole provided at the corresponding position on the opposite side of the tube, the first connecting hole serving as a half-through hole with no rear-side hole provided at the corresponding position on the opposite side of the tube, the tubular pole has a biasing spring cantilevered inside the tube, and has a latching pin attached to the biasing spring and spring-biased in the direction protruding outward through the first connecting hole, the connection between the connecting bracket and the long handle is effected by a combination of pin locking and screw locking, the pin locking being effected, in the state where the connecting bracket and the tubular pole are in communication with each other through the first connecting holes and the second connecting holes, as the spring-biased latching pin is automatically engaged with the two first connecting holes which are in communication with each other, the screw locking being effected, in that state, as the dedicated hand screw is manually inserted into the two second connecting holes which are in communication with each other and screwed into the internally threaded rear-side hole, and the disconnection between the connecting bracket and the long handle is effected, in the state where the connecting bracket and the tubular pole are in communication with each other through the first connecting holes and the second connecting holes, by a combination of unlocking operations of manually unscrewing and pulling the dedicated hand screw out of the second connecting holes, and pushing the latching pin engaged with the first connecting holes into the holes to unlock the pin.

Furthermore, the pole saw according to the present invention has, in addition to the above-described second feature, a third feature that the connecting tube of the connecting bracket and the tubular pole at the distal end of the long handle have their tubular cross sections in vertical oval shape similar to each other, the first connecting hole and the second connecting hole on each tube being positioned, apart from each other, on a line in the longitudinal direction at a top of the vertical oval shape, and the connecting tube has slits formed at respective sides thereof, each slit extending from an open end of the tube, over the position corresponding to the second connecting hole, to a position short of the position corresponding to the first connecting hole.

Effects of the Invention

According to the pole saw recited in claim 1, the pole saw includes the saw blade, the long handle provided with one or more stages of poles, and the connecting bracket for attaching the saw blade to the distal end of the long handle, wherein the connection and disconnection between the connecting bracket and the long handle are effected by a combination of the pin locking by the spring-biased latching pin and the screw locking by the dedicated hand screw having the grip head.

With this configuration, when the connecting bracket is removed from the long handle, the saw blade can also be detached. The detachment (disconnection) of the connecting bracket from the long handle can be effected manually, by unscrewing the dedicated hand screw provided with the grip head and unlocking the latching pin. Needless to say, the attachment (connection) can also be effected by manual operations alone. That is, the attaching/detaching operations can be performed solely manually, without the need of tools. The attachment/detachment can be performed freely and smoothly under any conditions. Accordingly, during work, a saw blade can be readily replaced with the one of an appropriate type, in terms of length, curve, etc., in accordance with the situations. During moving or during off-work periods, the saw blade can be easily detached, making it easy to handle. Furthermore, the inventive pole saw is advantageous in that, when stored, the long handle portion and the bracket portion can be stored separately, the bracket portion including the saw blade can be readily subjected to collective anticorrosive treatment of the metal portions, and the important metal portions can be readily stored, separately from the long handle, in an appropriate place.

According to the pole saw recited in claim 2, in addition to the functions and effects achieved by the configuration recited in claim 1 as described above, the pin locking by the latching pin and the screw locking by the dedicated hand screw provided with the grip head can be readily performed by using the first connecting hole and the second connecting hole arranged in the longitudinal direction, spaced apart from each other, on each of the connecting tube of the connecting bracket and the tubular pole at the distal end of the long handle.

More specifically, when the connecting tube of the connecting bracket and the tubular pole reach the position where they come to communicate with each other, the spring-biased latching pin arranged inside the tubular pole is automatically engaged with the two first connecting holes in the communicating position. Therefore, the operator only needs to do the operation of manually inserting the dedicated hand screw into the second connecting holes in the communicating state, and screwing the dedicated hand screw into the rear-side hole, to thereby complete the connection between the connecting bracket and the tubular pole. That is, all that is needed for the operator to do is to manually conduct screw locking at one location; the operator does not have to do screw locking operations at two locations. Because the screw locking is done at one location, the grip head of the dedicated hand screw can be increased in diameter. The resultant head is easy to grip, and the operator can readily apply sufficient force at the time of manual operation.

If screw locking were to be made at the two locations, a fairly long distance would have to be secured between the first connecting holes and the second connecting holes; otherwise, it would not be possible to increase the diameters of the grip heads of two dedicated hand screws required. This would create a dimensional problem of the connecting bracket.

Further, for screw locking at two locations of the first connecting holes and the second connecting holes, it would be necessary to increase the mutual positional accuracy of eight holes in total, i.e. the two first connecting holes and the two rear-side holes corresponding thereto, and the two second connecting holes and the two rear-side holes corresponding thereto; otherwise, it would not be possible to keep sufficient screwing accuracy.

In the pole saw recited in claim 2, while the second connecting holes are the through holes requiring the rear-side holes, the first connecting holes in which the latching pin is to be fitted are merely the half-through holes requiring no rear-side holes. This can reduce the time required for making holes, and particularly reduce the accuracy.

Furthermore, in the pole saw recited in claim 2, the connecting bracket mounted with the saw blade can be readily detached from the tubular pole at the distal end of the long handle by manual operations alone. Specifically, the dedicated hand screw may be manually unscrewed and pulled out of the second connecting holes first, and then the latching pin may be manually pushed into the first connecting holes and, in that state, the connecting tube of the connecting bracket and the tubular pole may be pulled apart from each other in the longitudinal direction. This can nearly halve the time taken for detachment as compared with the conventional case of screw locking at both locations.

According to the pole saw recited in claim 3, in addition to the functions and effects obtained by the configuration recited in claim 2 as described above, the connecting tube of the connecting bracket and the tubular pole at the distal end of the long handle have their tubular cross sections in vertical oval shape similar to each other. This facilitates alignment of the connecting tube and the tubular pole, while preventing them from being misaligned in the circumferential direction. The first connecting holes for use in pin locking and the second connecting holes for use in screw locking are arranged on the same line at the top of the vertical oval shape. This allows the manual operation on the latching pin and the manual operation on the dedicated hand screw to be readily performed in the same area. Further, as the slits are formed on the respective sides of the connecting tube, when the connecting tube and the tubular pole are to be connected by the dedicated hand screw, the diameter of the connecting tube can be reduced, which prevents rattling in the connection therebetween. Furthermore, each slit is configured to extend to a position short of the position corresponding to the first connecting hole, so that it will not adversely affect the engagement of the latching pin at the first connecting hole.

MODES FOR CARRYING OUT THE INVENTION

A pole saw according to an embodiment of the present invention will be described with reference to the following drawings, for understanding of the present invention. The following description, however, is not intended to restrict the invention recited in the claims of the present invention.

Figure 1:
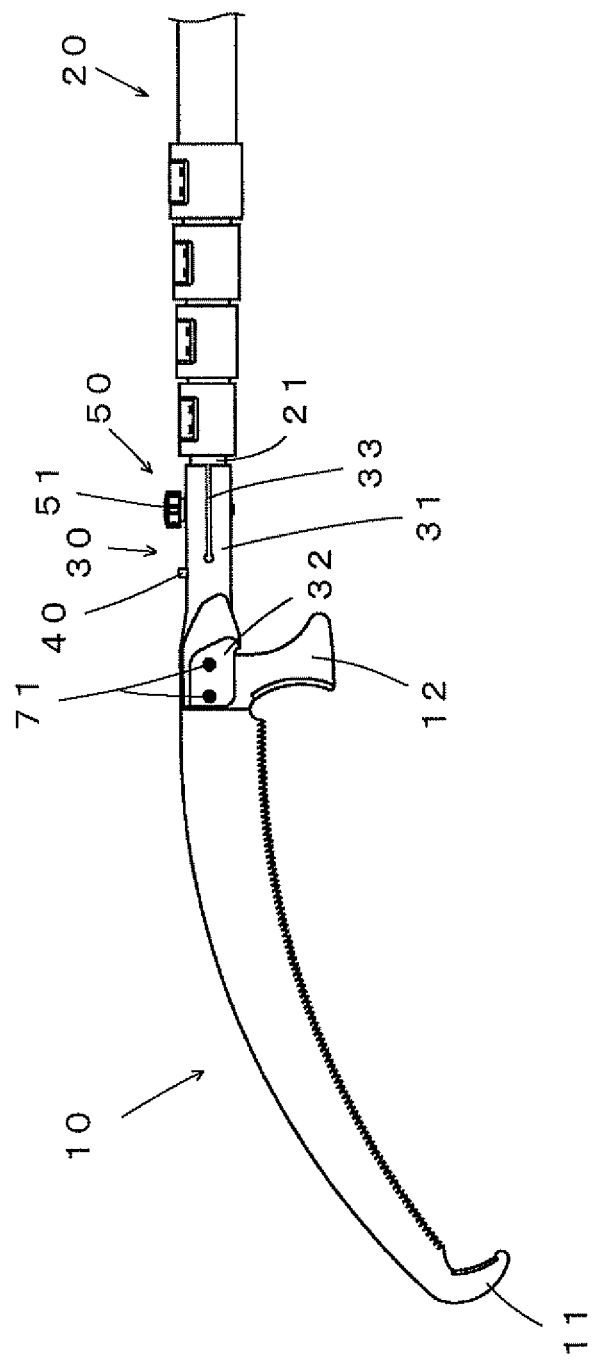
FIG. 1 is a schematic diagram of a pole saw according to an embodiment of the present invention.

Referring first to FIG. 1, the pole saw of the present invention includes a saw blade 10, a long handle 20, and a connecting bracket 30.

The saw blade 10 is large in size, for use in pruning high branches. The saw blade 10 has a sickle blade 11 formed at a distal end thereof. At a proximal end of the saw blade 10, a sickle blade 12 as another piece is screw-fixed together to the connecting bracket 30.

The long handle 20 has one or more stages of poles provided in a telescopic fashion. In the present embodiment, five stages of poles in total are arranged from the proximal end to the distal end. The pole at the most proximal end is provided with a grip section, not shown, as a handgrip.

The connecting bracket 30 is removably connected to a tubular pole 21 which is at the distal end of the long handle 20.

The connecting bracket 30 has a connecting tube 31, which is for connecting with the tubular pole 21 at the distal end of the long handle 20, and a securing flat section 32, which is located forward of the connecting tube and is used for fixedly securing the saw blade 10 by means of screws 71, 71.

The securing flat section 32 is formed in an inverted-U shape which continues at the back. The saw blade 10 and the sickle blade 12 are inserted into the securing flat section 32 and fixedly secured by the screws 71, 71. These screws 71 are tightened, using a tool, to prevent the saw blade 10 and/or the sickle blade 12 from easily coming off or moving. It is of course possible to loosen the screws 71, 71, using a tool, for replacement of a damaged saw blade 10 or sickle blade 12.

The connecting tube 31 is in a tubular shape, with slits 33 formed at respective sides thereof. Each slit 33 is formed to extend from an open end of the tube, over the position corresponding to a second connecting hole 31b, to a position short of the position corresponding to a first connecting hole 31a, The connecting holes will be described later.

For connection between the connecting tube 31 of the connecting bracket 30 and the tubular pole 21 at the distal end of the long handle 20, a latching pin 40 and a dedicated hand screw 50 are used. The latching pin 40 is spring-biased by a biasing spring 60, which will be described later.

Figure 2:
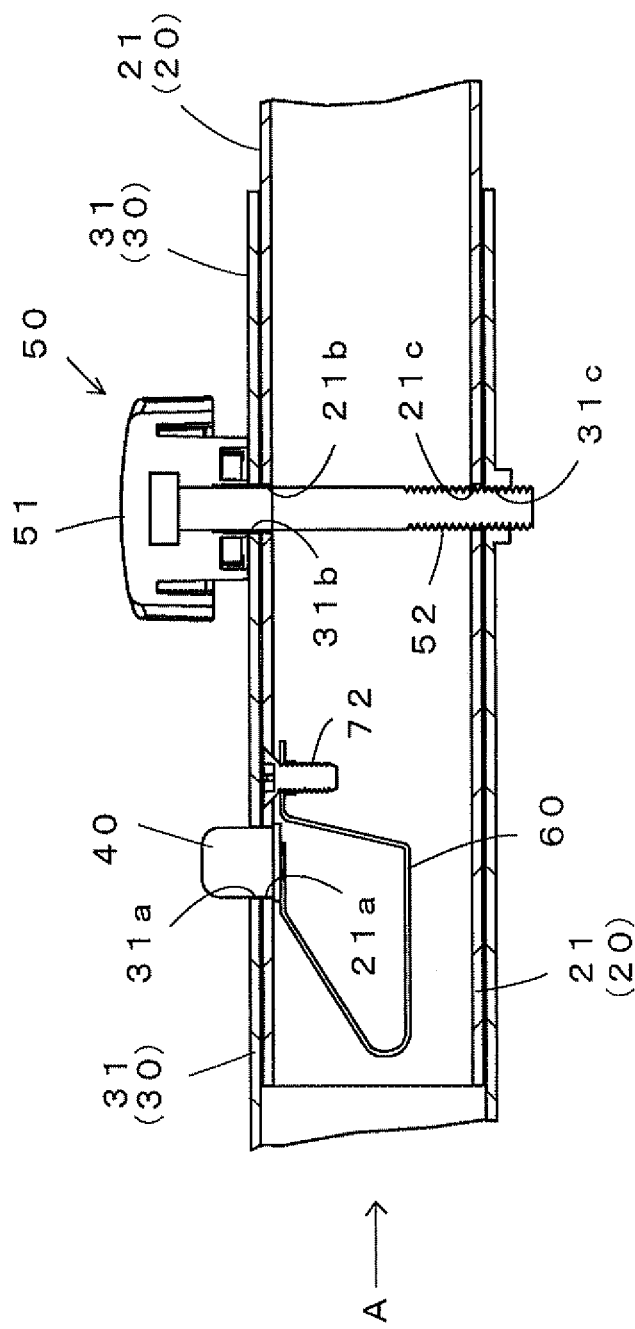
FIG. 2 is a vertical cross-sectional view of the main part of the pole saw according to the embodiment of the present invention, in the state where a connecting bracket is connected.
Figure 3:
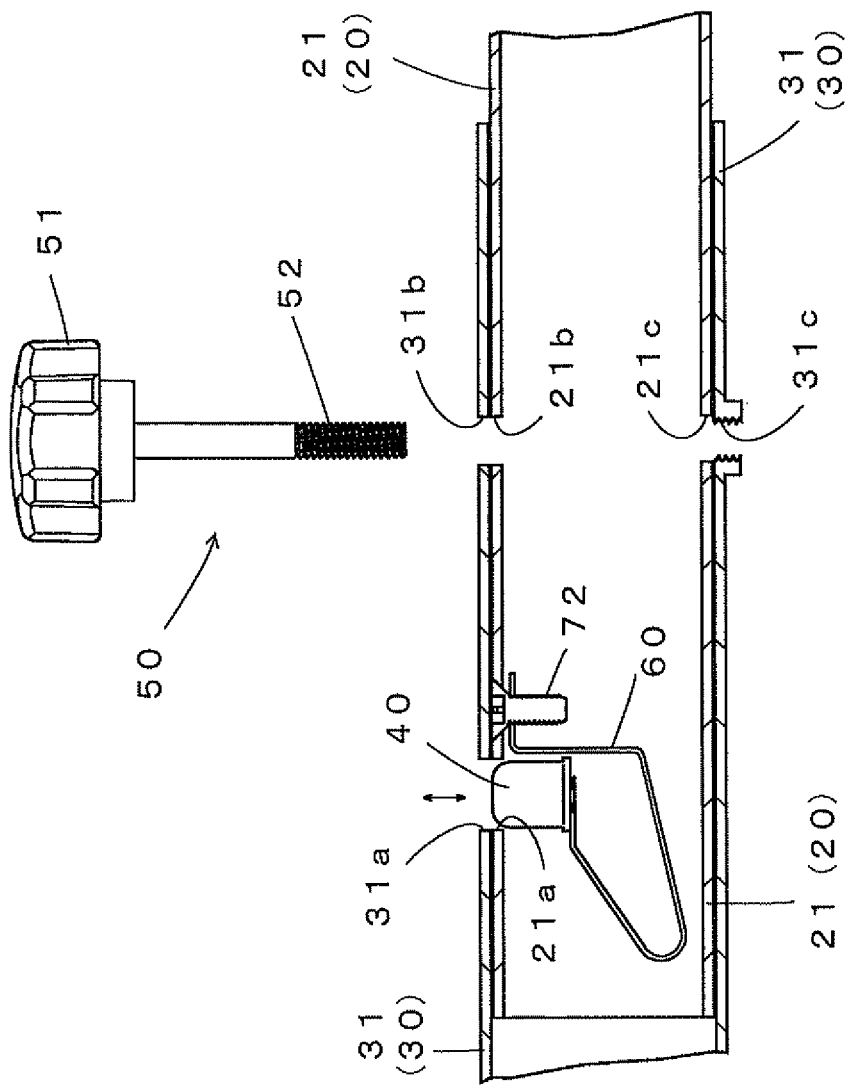
FIG. 3 is a vertical cross-sectional view of the main part of the pole saw according to the embodiment of the present invention, in the state where the connecting bracket is disconnected.
Figure 4:
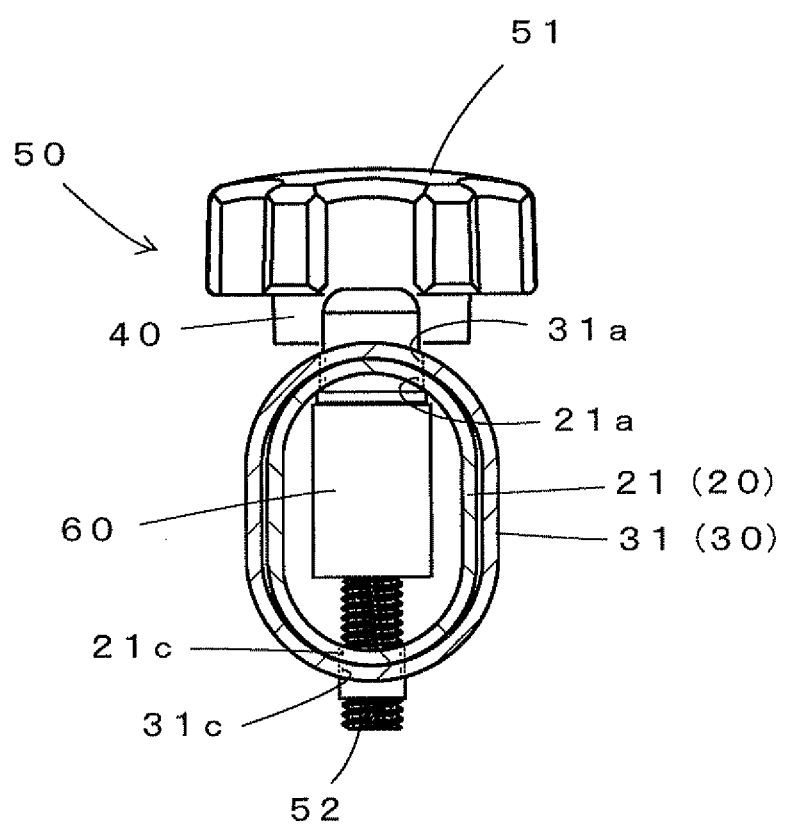
FIG. 4 is a view taken in the direction of an arrow A in FIG. 2.

Referring to FIGS. 2 to 4 as well, the connecting tube 31 of the connecting bracket 30 and the tubular pole 21 are configured such that the tubular pole 21 is inserted into the connecting tube 31.

The connecting tube 31 and the tubular pole 21 have their cross sections in vertical oval shape similar to each other. This prevents them from being largely misaligned with each other in the circumferential direction.

The tubular pole 21 has a first connecting hole 21a and a second connecting hole 21b provided at a top of the vertical oval shape. The holes are spaced apart from each other in the longitudinal direction. The first connecting hole 21a and the second connecting hole 21b are configured such that the centers of these holes are on a same line in the longitudinal direction at the top of the vertical oval shape.

Similarly, the connecting tube 31 has a first connecting hole 31a and a second connecting hole 31b provided at a top of the vertical oval shape. The holes are spaced apart from each other in the longitudinal direction. The first connecting hole 31a and the second connecting hole 31b are also configured such that the centers of these holes are on a same line in the longitudinal direction at the top of the vertical oval shape.

The first connecting hole 21a and the first connecting hole 31a are configured such that they are aligned and in communication with each other at the position where the tubular pole 21 and the connecting bracket 30 are connected. The two second connecting holes 21b, 31b are also configured such that they are aligned and in communication with each other at the position where the tubular pole 21 and the connecting bracket 30 are connected.

Accordingly, at the position where the connecting bracket 30 and the tubular pole 21 are connected, the first connecting holes 21a, 31a are aligned and communicate with each other and, at the same time, the second connecting holes 21b, 31b are aligned and communicate with each other.

The first connecting holes 21a, 31a are the holes with which the latching pin 40 is to be engaged. These first connecting holes 21a, 31a are designed as half-through holes which have no rear-side holes at the corresponding positions on the opposite side of the respective tubes, unlike the case of the second connecting holes 21b, 31b, which will be described later.

The latching pin 40 to be engaged with the first connecting holes 21a, 31a is attached to a distal end of the biasing spring 60.

Figure 5:
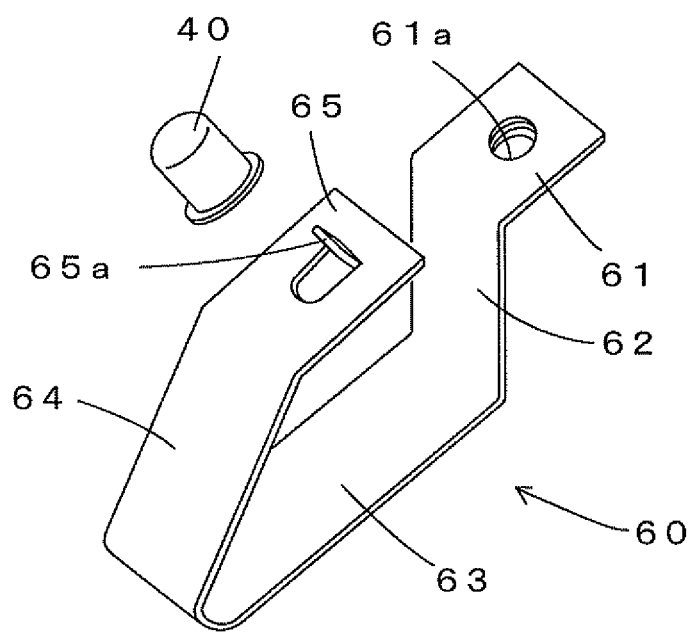
FIG. 5 is a perspective view of a latching pin and a biasing spring.

Referring to FIG. 5 as well, the biasing spring 60 is configured as a leaf spring strip. This biasing spring 60 is made up of a proximal attaching planar section 61, a drop section 62, an advancing section 63, a folded and sloped section 64, and a distal attaching planar section 65. The proximal attaching planar section 61 is provided with an extruded tapped hole 61a. The distal attaching planar section 65 has a cut-and-raised piece 65a formed therein.

The biasing spring 60 is cantilevered inside the tubular pole 21, as it is fixedly secured to a part of the tubular pole 21 by a screw 72 which is threaded into the extruded tapped hole 61a at the proximal attaching planar section 61.

The latching pin 40 is fitted onto and fixed to the cut-and-raised piece 65a at the distal attaching planar section 65 of the biasing spring 60.

The latching pin 40, attached to the biasing spring 60 cantilevered inside the tubular pole 21, is spring-biased in the direction protruding outward from the first connecting hole 21a of the tubular pole 21. Therefore, when the first connecting hole 21a at the tubular pole 21 and the first connecting hole 31a at the connecting bracket 30 communicate with each other, the spring-biased latching pin 40 is automatically engaged with the first connecting holes 21a, 31a, and protrudes through the holes 21a, 31a, which are in communication with each other, to the outside of the connecting bracket 30.

The diameter of the latching pin 40 may be configured such that its radius gradually increases from the distal end to the proximal end. Such a configuration of the latching pin 40 with its radius increasing toward the proximal end can eliminate rattling when the pin is engaged with the first connecting holes 21a, 31a.

The second connecting holes 21b, 31b are for receiving the dedicated hand screw 50. These second connecting holes 21b, 31b have rear-side holes 21c, 31c provided at the corresponding positions on the opposite side of the respective tubes.

The rear-side hole 21c of the tubular pole 21 is formed at the position exactly behind the second connecting hole 21b of the tubular pole 21. This makes the second connecting hole 21b serve as a through hole provided with the rear-side hole 21c, and the dedicated hand screw 50 is configured to be inserted into this through hole.

The rear-side hole 31c at the connecting tube 31 of the connecting bracket 30 is formed at the position exactly behind the second connecting hole 31b of the connecting tube 31. This rear-side hole 31c is an internally threaded hole, which has undergone extruding wherein the hole was expanded so as to be extruded toward the rear side of the tube, and an internal thread was formed on the inner surface of the extruded hole. As a result, the second connecting hole 31b at the connecting bracket 30 serves as a through hole provided with the internally threaded rear-side hole 31c. The dedicated hand screw 50 is inserted through the second connecting hole 31b and screwed into the rear-side hole 31c.

The dedicated hand screw 50 is a screw turned solely by hand, which is provided with a grip head 51. The dedicated hand screw 50 has its lower section provided with an external thread 52. This external thread 52 is configured to be screwed with the rear-side hole 31c of the connecting bracket 30.

The grip head 51 is sized at least to allow an operator to place the entire pad side of the thumb on about a half region of the side peripheral surface of the grip head 51 and to place the side of the flexed forefinger on about the remaining half region of the side periphery of the grip head 51. The grip head 51 of this or bigger size ensures that the operator can grab the grip head 51 with a sufficiently large contact area of the entire pad side of the thumb and the entire side of the flexed forefinger with respect to the side peripheral surface of the grip head 51, thereby enabling sufficient force to be transmitted to the grip head 51 so as to turn the dedicated hand screw 50.

When a screw has a head that an operator can merely take between the pads of the thumb and forefinger, even if the screw looks like a hand screw, manually screwing it in practice will not provide a connection between the connecting bracket 30 and the tubular pole 21 that is firm enough to prevent them from becoming misaligned or moving. Therefore, such a screw head is not regarded as the grip head 51 of the present invention.

Referring now to FIGS. 1, 2, and 3, a description will be made of the operation, performed in the state where the connecting bracket 30 is connected to the long handle 20 by the latching pin 40 and the dedicated hand screw 50 (i.e. in the state where they are in communication with each other through the first connecting holes 21a, 31a and the second connecting holes 21b, 31b), for detachment of the connecting bracket 30.

First, in the state shown in FIGS. 1 and 2, the dedicated hand screw 50 is manually operated so as to be unscrewed from the rear-side hole 31c at the connecting tube 31 of the connecting bracket 30.

Then, as shown in FIG. 3, the dedicated hand screw 50 is pulled out of the rear-side hole 21c at the tubular pole 21 of the long handle 20, and further out of the second connecting holes 21b, 31b of the long handle 20 and the connecting bracket 30, to the outside.

Thereafter, as shown in FIG. 3, the latching pin 40, which has been engaged with the first connecting holes 21a, 31a and protruding therefrom, is pushed into the holes with the finger or the like for unlocking the pin. In this state, the connecting bracket 30 is pulled in the longitudinal direction of the tubular pole 21 so as to separate them from each other. In this manner, the detachment of the connecting bracket 30 from the long handle 20 is completed.

A description will now be made of the operation for connecting the connecting bracket 30, which is in a detached state, to the long handle 20 by the latching pin 40 and the dedicated hand screw 50.

The connecting bracket 30, which is now in the detached state, is picked up and inserted to the tubular pole 21 of the long handle 20. In practice, the tubular pole 21 is to be inserted, from its distal end, into the tube of the connecting tube 31 of the connecting bracket 30. At this time, the tubular pole 21 is inserted into the connecting tube 31, with the latching pin 40 at the tubular pole 21 being pushed inside the tubular pole 21.

When the tubular pole 21 is inserted to the position where the first connecting hole 21a of the tubular pole 21 is aligned with the first connecting hole 31a of the connecting bracket 30, the first connecting holes 21a, 31a communicate with each other (see FIG. 3). Then, the latching pin 40 on the tubular pole 21 side advances, by spring biasing, into the first connecting hole 31a of the connecting bracket 30 in the communicating state, to achieve automatic engagement. In this state, the second connecting hole 21b of the tubular pole 21 and the second connecting hole 31b of the connecting bracket 30 are also aligned and in communication with each other.

Thereafter, with the grip head 51 of the dedicated hand screw 50 held by the hand, the dedicated hand screw 50 is inserted into the second communicating holes 31b, 21b, which are in communication with each other, and further inserted through the rear-side hole 21c of the tubular pole 21 to reach the rear-side hole 31c of the connecting bracket 30. Then, the grip head 51 is manually turned to screw the dedicated hand screw 50 into the internal thread on the rear-side hole 31c of the connecting bracket 30 for screw locking.

In this manner, the connection of the connecting bracket 30 to the long handle 20 is completed.

As described above, according to the pole saw of the present invention, the connection and disconnection between the connecting bracket 30 and the long handle 20 can be performed solely manually, without the need of any tools, by a combination of pin locking by the spring-biased latching pin 40 and screw locking by the dedicated hand screw 50 having the grip head. Further, the screw locking operation is required only at one location by the dedicated hand screw 50. At the other location, it is only necessary to do the pin locking by the biased latching pin 40, without the need of the screwing operation. As such, the attachment and detachment of the connecting bracket 30 can be performed easily and smoothly at any place. Accordingly, a saw blade can be readily replaced with the one of an appropriate type selected in accordance with the situations during work. Further, during off-work periods, the saw blade can be easily removed, allowing the bulky pole saw to be handled with ease. It is of course readily possible to store the long handle portion and the bracket portion in separate places. The bracket portion including the saw blade can be stored in the place where they are prevented from rusting, while the long handle portion can be stored in the place where it can be easily leaned up against a wall. As such, they can be advantageously stored separately with ease.

Further, according to the pole saw of the present invention, the pin locking by the latching pin 40 and the screw locking by the dedicated hand screw 50 having the grip head 51 can be performed in a simple manner by using the first connecting holes 21a, 31a and the second connecting holes 21b, 31b which are positioned, apart from each other in the longitudinal direction, on the connecting tube 31 of the connecting bracket 30 and the tubular pole 21 at the distal end of the long handle 20, respectively. When the connecting tube 31 of the connecting bracket 30 and the tubular pole 21 reach the position where they come to communicate with each other, the latching pin 40 on the biasing spring 60 is automatically engaged with the first connecting holes 21a, 31a. This eliminates the need for an operator to do the pin locking operation. The operator only needs to do the screw locking operation with the dedicated hand screw 50, to complete the connection. As the screw locking is conducted only at one location, it is possible to increase the diameter of the grip head 51 of the dedicated hand screw 50, so that the grip head 51 is easy to grip and the operator can readily apply sufficient force at the time of manual operation.

If screw locking were to be made at the two locations, a fairly long distance would have to be secured between the first connecting holes 21a, 31a and the second connecting holes 21b, 31b; otherwise, it would not be possible to increase the diameters of the grip heads 51 of two dedicated hand screws 50 required, making the manual operation difficult. Further, for screw locking at the two locations, it would be necessary to increase the mutual positional accuracy of eight holes in total, i.e. the two first connecting holes 21a, 31a and the two rear-side holes corresponding thereto, and the two second connecting holes 21b, 31b and the two rear-side holes corresponding thereto. In the present invention, while the second connecting holes 21b, 31b are through holes requiring the rear-side holes, the first connecting holes 21a, 31a in which the latching pin 40 is to be fitted are merely half-through holes requiring no rear-side holes. This can reduce the time required for making holes, and particularly reduce the accuracy.

Furthermore, according to the pole saw of the present invention, the connecting tube 31 of the connecting bracket 30 and the tubular pole 21 at the distal end of the long handle 20 have their tubular cross sections in vertical oval shape similar to each other. This facilitates alignment of the connecting tube 31 and the tubular pole 21, while preventing them from being misaligned in the circumferential direction. The first connecting holes 21a, 31a for use in pin locking and the second connecting holes 21b, 31b for use in screw locking are arranged on the same line at the top of the vertical oval shape. This allows the manual operation on the latching pin 40 and the manual operation on the dedicated hand screw 50 to be readily performed in the same area.

Furthermore, as the slits 33 are formed on the respective sides of the connecting tube 31, when the connecting tube 31 and the tubular pole 21 are to be connected by the dedicated hand screw 50, the diameter of the connecting tube 31 can be reduced, which prevents rattling in the connection therebetween. Each slit 33 extends to a position short of the position corresponding to the first connecting hole 31a, so that it does not adversely affect the engagement of the latching pin 40 at the first connecting hole 31a.

INDUSTRIAL APPLICABILITY

The present invention has an industrial application as a pole saw for use in pruning high branches.

DESCRIPTION OF THE REFERENCE CHARACTERS

10 saw blade
11 sickle blade
12 sickle blade
20 long handle
21 tubular pole
21a first connecting hole
21b second connecting hole
21c rearside hole
30 connecting bracket
31 connecting tube
31a first connecting hole
31b second connecting hole
31c rearside hole
32 securing flat section
33 slit
40 latching pin
50 dedicated hand screw
51 grip head
52 external thread
60 biasing spring
61 proximal attaching planar section
61a extruded tapped hole
62 drop section
63 advancing section
64 folded and sloped section
65 distal attaching planar section
65a cut-and-raised piece
71 screw
72 screw

What is claimed is:

1. A pole saw comprising a saw blade, a long handle provided with one or more stages of poles, and a connecting bracket for attaching the saw blade to a distal end of the long handle, wherein connection and disconnection between the connecting bracket and the long handle are effected by a combination of pin locking and screw locking, the pin locking being effected by a spring-biased latching pin, the screw locking being effected by a dedicated hand screw having a grip head;

wherein the connecting bracket includes a securing flat section for use in screw-fixing the saw blade, and a connecting tube for connecting a tubular pole at a distal end of the long handle, the connecting tube of the connecting bracket has a first connecting hole and a second connecting hole provided at two locations spaced apart from each other in a longitudinal direction, the second connecting hole serving as a through hole with an internally threaded rear-side hole provided at the corresponding position on the opposite side of the tube, the first connecting hole serving as a half-through hole with no rear-side hole provided at the corresponding position on the opposite side of the tube, the tubular pole, as with the connecting tube of the connecting bracket, has a first connecting hole and a second connecting hole provided at two locations spaced apart from each other in a longitudinal direction, the second connecting hole serving as a through hole with a non-threaded rear-side hole provided at the corresponding position on the opposite side of the tube, the first connecting hole serving as a half-through hole with no rear-side hole provided at the corresponding position on the opposite side of the tube, the tubular pole has a biasing spring cantilevered inside the tube, and has the spring-based latching pin attached to the biasing spring and spring-biased in the direction protruding outward through the first connecting hole, the connection between the connecting bracket and the long handle is effected by the combination of pin locking and screw locking, the pin locking being effected, in the state where the connecting bracket and the tubular pole are in communication with each other through the first connecting holes and the second connecting holes, as the spring-biased latching pin is automatically engaged with the two first connecting holes which are in communication with each other, the screw locking being effected, in that state, as the dedicated hand screw is manually inserted into the two second connecting holes which are in communication with each other and screwed into the internally threaded rear-side hole, and the disconnection between the connecting bracket and the long handle is effected, in the state where the connecting bracket and the tubular pole are in communication with each other through the first connecting holes and the second connecting holes, by the combination of unlocking operations of manually unscrewing and pulling the dedicated hand screw out of the second connecting holes, and pushing the latching pin engaged with the first connecting holes into the holes to unlock the pin.

2. The pole saw according to claim 1, wherein the connecting tube of the connecting bracket and the tubular pole at the distal end of the long handle have their tubular cross sections in vertical oval shape similar to each other, the first connecting hole and the second connecting hole on each tube being positioned, apart from each other, on a line in the longitudinal direction at a top of the vertical oval shape, and the connecting tube has slits formed at respective sides thereof, each slit extending from an open end of the tube, over the position corresponding to the second connecting hole, to a position short of the position corresponding to the first connecting hole.

* * * * *